United States Patent [19]
Focarino

[11] Patent Number: 5,976,252
[45] Date of Patent: Nov. 2, 1999

[54] APPARATUS FOR DEPOSITING PRECISELY METERED QUANTITIES OF AN EMULSION ON A SURFACE

[75] Inventor: Gary Focarino, Flemington, N.J.

[73] Assignee: 3M Innovative Properties Company, St. Paul, Minn.

[21] Appl. No.: 08/845,671

[22] Filed: Apr. 25, 1997

[51] Int. Cl.$^6$ ...................................................... B05C 5/00
[52] U.S. Cl. ........................... 118/401; 118/410; 118/411; 118/412
[58] Field of Search ..................................... 118/300, 401, 118/410–412, 313; 222/420, 330

[56] References Cited

U.S. PATENT DOCUMENTS

| | | | |
|---|---|---|---|
| 3,572,400 | 3/1971 | Casner et al. | 141/1 |
| 3,731,648 | 5/1973 | Gerber et al. | 118/401 |
| 3,810,779 | 5/1974 | Pickett et al. | 117/37 |
| 3,965,742 | 6/1976 | Parker | 73/356 |
| 3,970,119 | 7/1976 | Doane | 141/1 R |
| 4,064,872 | 12/1977 | Caplan | 128/2 H |
| 4,130,085 | 12/1978 | Hewitt | 118/401 |
| 4,133,918 | 1/1979 | Simms et al. | 118/401 |
| 4,232,552 | 11/1980 | Hof et al. | 73/356 |
| 4,233,801 | 11/1980 | Watt | 53/453 |
| 4,299,727 | 11/1981 | Hof et al. | 252/408 |
| 4,345,470 | 8/1982 | Hof et al. | 374/106 |
| 4,397,570 | 8/1983 | Hof et al. | 374/162 |
| 4,941,428 | 7/1990 | Engel | 118/401 |

FOREIGN PATENT DOCUMENTS

| | | |
|---|---|---|
| 0 684 463 A1 | 11/1995 | European Pat. Off. . |
| 84 38 254 U | 4/1985 | Germany . |

*Primary Examiner*—Laura Edwards
*Attorney, Agent, or Firm*—Gary L. Griswold; John H. Hornickel; Jeffrey J. Hohenshell

[57] ABSTRACT

A method and apparatus for depositing precisely metered quantities of an emulsion on a surface are disclosed. The method and apparatus are particularly useful for assembly of reversible clinical thermometers. The apparatus involves (a) at least one cartridge having a volume containing the emulsion composition; (b) at least one piston associated with each cartridge for collapsing the volume under a controlled pressure; (c) at least one tubular needle for receiving a flow of emulsion composition from each cartridge; (d) a fluid connection between each tubular needle and each cartridge for delivering the emulsion composition from each cartridge to each needle; and (e) a valve for each fluid connection. The method for depositing precisely metered quantities of an emulsion on a surface, comprising the steps of (a) pressuring a cartridge having a volume containing the emulsion composition to cause flow of the composition from the cartridge; (b) controlling the pace of flow of the composition at a valve; (c) delivering the composition from the valve through a fluid connection to tubular needle; and (d) contacting a dollop of the composition protruding from an open end of the needle on to the surface.

3 Claims, 3 Drawing Sheets

APPARATUS FOR DEPOSITING PRECISELY METERED QUANTITIES OF AN EMULSION ON A SURFACE

FIELD OF INVENTION

This invention relates to deposition of a viscous emulsion composition on to a surface. More particularly, this invention relates to a method and apparatus useful for metering precise quantities of different viscous emulsion compositions on to a disposable clinical thermometer.

BACKGROUND OF INVENTION

Modern productivity requires automation of assembly whenever possible. In some devices, automation is essential for reproducible results. Modem thermometry or other quantifiable properties requires reproducibility for consistent standards.

Over the last 20 years, clinical thermometry has developed single-use, handheld thermometers that use precise quantities of different compositions of solid solutions of two thermally responsive materials in a plurality of cavities on a single strip of laminated material, each composition in each cavity alterable at a different temperature. The precision of the different compositions responsive to the different temperatures has permitted these chemical thermometers to be truly qualified as clinical devices.

A number of patents describe the advances made to this field of clinical thermometry. Among these patents are those issued to Hof et al. such as U.S. Pat. Nos. 4,232,552; 4,299,727; 4,345,470; and 4,397,570, which describe improvements to the temperature indicating compositions of matter, the all-plastic construction of the thermometer, and the like.

Automated assembly of the clinical thermometer reduces costs, improves productivity, improves quality assurance, and provides other benefits. In the assembly of a clinical thermometer where as many as 45 different compositions are being deposited in 45 separate cavities on the thermometer surface, precise metering and delivery of the compositions to the cavities, in registration, is essential for productive assembly of the clinical thermometers. U.S. Pat. No. 3,810,779 (Pickett et al.) discloses a method and apparatus for depositing precisely metered quantities of liquid on a surface, particularly temperature indicating compositions of matter on to the surface of a clinical thermometer. The method and apparatus disclosed in Pickett et al. has formed a basis for the construction of automated machinery to meter and deliver 45 different compositions to the 45 cavities for detecting temperatures ranging from 96.0° F. to 104.8° F. (35.5° C. to 40.4° C.). The Pickett et al. apparatus relies on a gravity feed of a composition that is a liquid at the temperature at which it is metered and delivered, yet a solid at ambient temperature.

Clinical thermometry has enjoyed the advances disclosed by the Hof et al. patents and the Pickett et al. patent because the thermometers can be precisely manufactured inexpensively and because the inexpensive clinical thermometers can be disposed of after a single use. The clinical thermometer can be taken, then the instrument disposed to avoid the transmission of viruses, bacteria, and other germs that unfortunately plague reusable thermometer devices.

Clinical thermometry also is benefitting from advances in the nature of the temperature indicating compositions of matter whereby the amount of energy and time needed to reverse the "firing" of one of the compositions in one of the cavities from freezing temperatures overnight to room temperatures for a few hours. Some of these new reversible thermometer compositions employ an emulsion of a thermally responsive material, means for observing a change in state of the material such as a dye, and a matrix forming material in which the thermally responsive material is dispersed. Reversible thermometer compositions of this type are disclosed in European Patent Publication 0 684 463 (A1) (Hof). The viscosity of the emulsion is considerably greater than the viscosity of the mixtures disclosed in the Hof et al. patents. Thus, the apparatus disclosed in the Pickett et al. patent that relies on liquid delivery of the compositions to the cavities is inadequate for automated assembly of the reversible clinical thermometers.

SUMMARY OF INVENTION

The present invention solves the problem of automated manufacturing of reversible clinical thermometers by providing an unexpectedly simple delivery system that can be adjusted to the various viscosities of the different compositions of matter to be metered and delivered to the cavities on a thermometer strip.

One aspect of the invention is an apparatus for metering and delivering a precise quantity of an emulsion composition to a surface, comprising: (a) at least one cartridge having a volume containing the emulsion composition; (b) at least one piston associated with each cartridge for collapsing the volume under a controlled pressure; (c) at least one tubular needle for receiving a flow of emulsion composition from each cartridge; (d) a fluid connection between each tubular needle and each cartridge for delivering the emulsion composition from each cartridge to each needle; and (e) a valve for each fluid connection.

Another aspect of the invention is a method of making a reversible clinical thermometer having about 45–50 different temperatures in increments of 0.2° F. (0.1° C.) ranging from about 96–104° F. (35.5–40.4° C.). The method involves depositing precisely metered quantities of an emulsion on a surface, comprising the steps of (a) pressuring a cartridge having a volume containing the emulsion composition to cause flow of the composition from the cartridge; (b) controlling the pace of flow of the composition at a valve; (c) deliverying the composition from the valve through a fluid connection to tubular needle; and (d) contacting a dollop of the composition protruding from an open end of the needle on to the surface.

A feature of the invention is the ability to accommodate and adjust for the various viscosities of the emulsions yet meter and deliver precise quantities of each emulsion to each cavity without missing the cavity, spreading the emulsion of the plateau between adjoining cavities, or overfilling/underfilling each cavity.

Another feature of the invention is the ease of placement and removal of individual emulsion reservoirs for each emulsion composition.

Another feature of the invention is the delivery of a plurality of emulsion feedstreams to the thermometer cavities in order that more than one thermometers can be filled concurrently.

An advantage of the invention is the inexpensive manufacture using an automated assembly apparatus of a reversible clinical thermometer containing as many as 45–50 different compositions of emulsions, each clinically responsive to a specific temperature.

Another advantage of the invention is the ability to manufacture an emulsion-based clinical thermometer that avoids the difficulties of manufacture encountered in a liquid-based clinical thermometer environment, as disclosed in U.S. Pat. Nos. 4,232,552; 4,299,727; 4,345,470; and 4,397,570 (all Hof et al.), including heating and freezing steps during manufacture and prior to storage that are avoided by the emulsion-based chemistry disclosed in European Patent Publication 0 684 463 (A1) (Hof) and copending, coassigned, U.S. patent application Ser. No. 08/425,162 (Hof), now U.S. Pat. No. 5,816,707 the disclosures of which are incorporated by reference herein.

Further features and advantages of the invention will be described with the embodiments of the invention using the following drawings.

BRIEF DESCRIPTION OF DRAWINGS

FIGS. 4a–4g, is an illustration of the sequence of delivery of one emulsion composition from one tubular needle into one cavity on the surface of a thermometer.

EMBODIMENTS OF INVENTION

Clinical Thermometers and Machinery

U.S. Pat. No. 3,810,779 (Pickett et al.), the disclosure of which is incorporated by reference herein, discloses the essences of clinical thermometry assembly using liquid temperature indicating compositions of matter.

U.S. Pat. No. 4,345,470 (Hof et al.), the disclosure of which is incorporated by reference herein, discloses a preferred all-plastic disposable thermometer having 45 cavities on a major surface of the thermometer.

U.S. Pat. No. 4,397,570 (Hof et al.), the disclosure of which is incorporated by reference herein, discloses a preferred cover layer for the clinical thermometer using polybutylene adhesive.

Copending, coassigned, U.S. patent application Ser. No. 08/425,162 (Hof) and copending, coassigned, U.S. patent application Ser. No. 08/846/57, (Hof) (Attorney Docket 53168USA7A), now abandoned the disclosures of which are incorporated by reference herein, disclose preferred emulsion compositions for metering and delivery to a reversible thermometer cavities.

Emulsion Cartridges and Cartridge Retaining System

The viscosities of the emulsions useful in the present invention range from about 1000 cSt to about 1,000,000 cSt and preferably from about 10,000 cSt to about 750,000 cSt. As such, these emulsion compositions are much more viscous than the liquid compositions of conventional clinical thermometers having temperature indicating compositions of matter such as disclosed in the Hof et al. patents identified above. Moreover, from the time of mixing these emulsions to the time of metering and delivery of these emulsions, the viscosity exceeds that suitable for the use of the method and apparatus disclosed by Pickett et al. from their reservoirs to their vials to their tubular needles.

Figure 1:
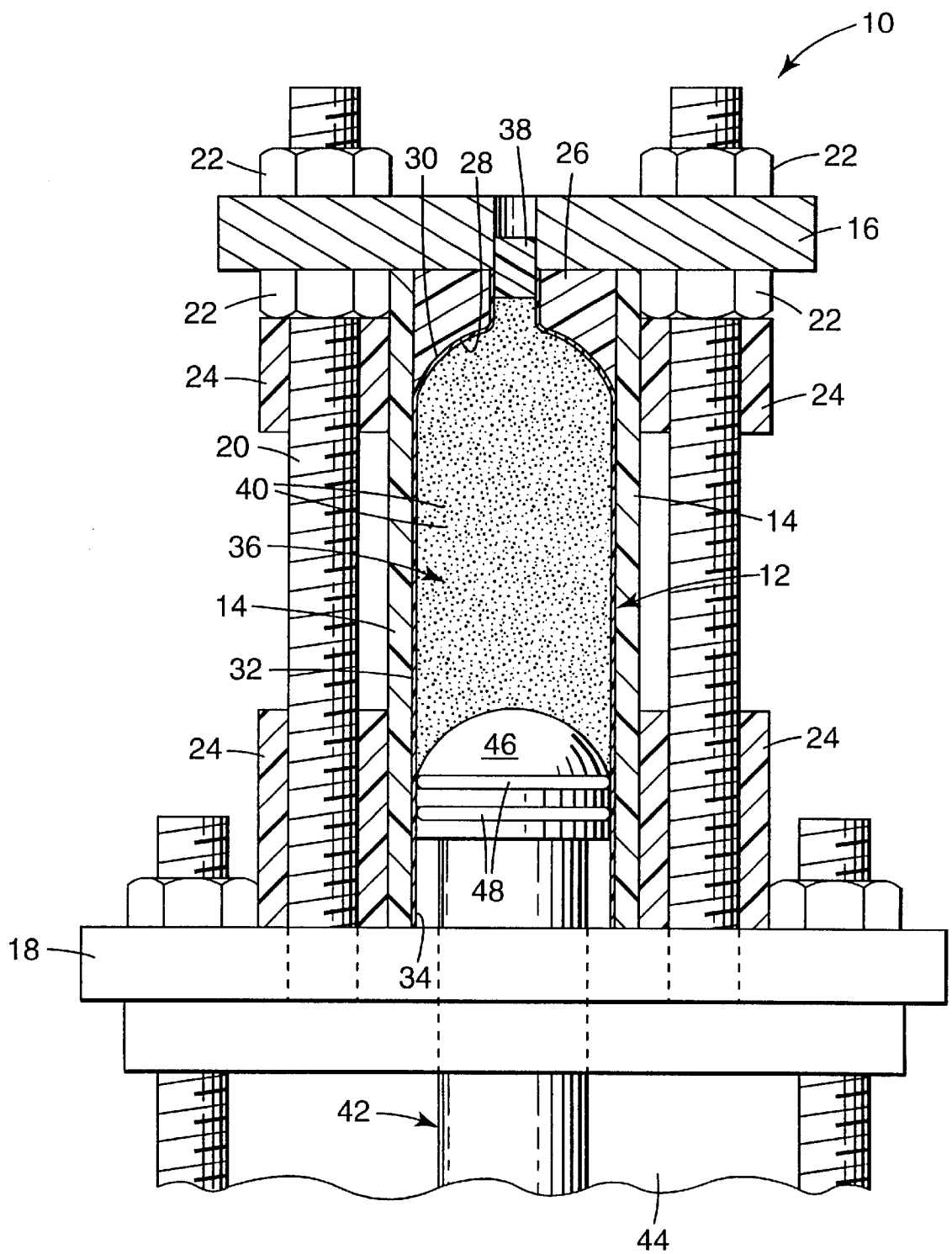
FIG. 1 is a schematic of a cartridge retaining system in partial cross-section.

Unexpectedly, the emulsion compositions required for reversible clinical thermometers, for which there has been a long-felt need, can be mixed, metered and delivered using a cartridge placed into and removed from a cartridge retaining system shown in partial cross-section in FIG. 1.

The cartridge retaining system 10 is used in the present invention to place a cartridge 12 holding one emulsion composition in the assembly apparatus. The cartridge 12 rests in a cartridge cradle 14, which in turn rests within an assembly of two retaining steel plates 16 and 18 separated by, yet held together by four alloy steel bolts 20 with associated hexangle metallic fasteners 22. Polymeric spacers 24 are placed on bolts 20 between plates 16 and 18 for the purpose of supporting the cartridge 12 between plates 16 and 18.

The cradle 14 comprises a cartridge cap 26 having an interior surface 28 matching an exterior surface 30 of cartridge 12.

The cartridge 12 comprises an high density polyethylene vessel 32 having one open end 34 and the exterior surface 30 matching interior surface 28 of cartridge cap 26, and a "button" 38 which forms a mechanical seal between the cartridge 12 and the retaining plate 16. Within the cartridge volume, generally 36, is a quantity of mixed emulsion composition 40 of a formulation under quality assurance to record a change in color clinically responsively to a predetermined temperature.

More particularly, plate 16 is a retaining plate having a hole in which button 38 resides while plate 18 is a cylinder plate, through which a hole resides for insertion a piston 42 of a powered cylinder 44. Cylinder 44 can be powered by any suitable controllable means including fluidic pressure (i.e., hydraulic or pneumatic pressure).

Piston 44 has a head 46 having an exterior surface matching the exterior surface 30 of cartridge 12 for assurance of complete compression of volume 36 and evacuation of composition 40 from the open end 34 toward the button 38 as piston head 46 projects from cylinder 44. A double O-ring assembly (generally 48) assures ease of sliding of piston head 46 into cartridge 12 and also assures the pressurized chemical does not flow around piston head 46.

Figure 2:
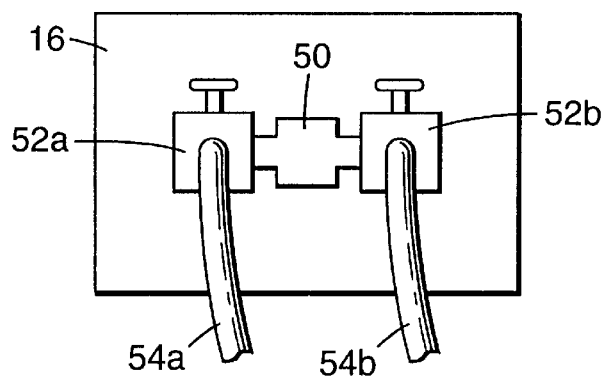
FIG. 2 is an illustration of the flow control valves associated with each cartridge retaining system.

FIG. 2 is an illustration of the opposite of plate 16 on which is mounted a metallic T-coupler 50 which diverts the flow of composition 40 from cartridge 12 into more than one direction. As seen in FIG. 2, two screw valves 52a and 52b are fluidly connected to coupler 50. Polymeric tubing 54a and 54b are fluidly connected to valves 52a and 52b, respectively, preferably in a system where valves 52a and 52b have a compression fitting terminii comprising a metallic ferrule that deforms the exterior surface of tubing with a serrated sleeve for assured gripping of tubing over and about such valve terminii.

Metering and Delivery Array

Figure 3:
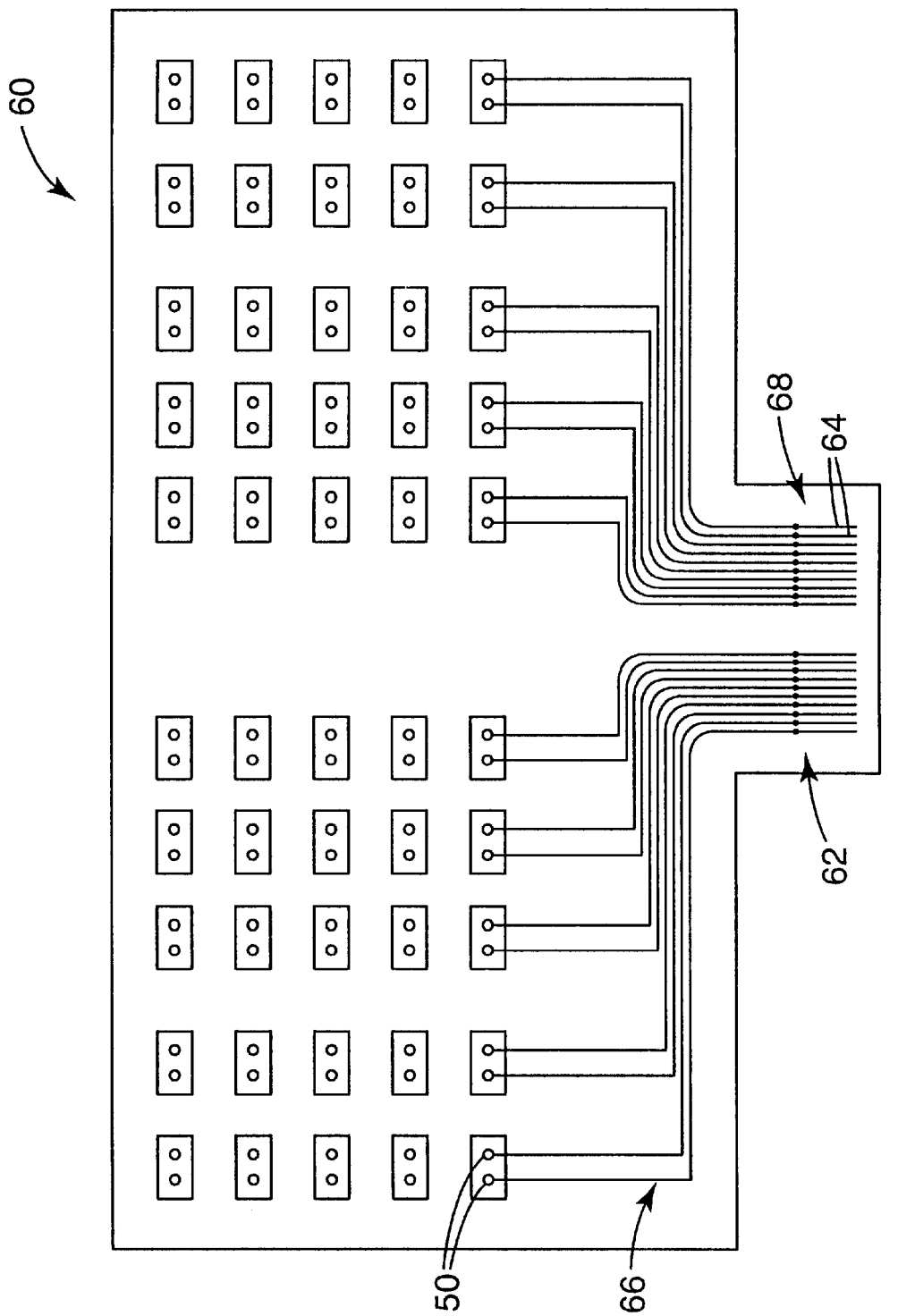
FIG. 3 is an illustration of an array of flow control valves fluidly connected to a corresponding array of tubular needles that meters and delivers the emulsions to their respective cavities on the thermometer surface.

FIG. 3 is an illustration of an array 60 of T-couplers and valves and tubing all fluidly connected to their respective counterparts in an array 62 of tubular needles 64 through which emulsion composition 40 is delivered to cavities of clinical thermometers of the type disclosed in U.S. Pat. No. 4,345,470 (Hof et al.). For purposes of illustration only, a first row 66 of couplers 50 are shown in fluid connection with a first row 68 of tubular needles 64; however, it is to be understood that as many as 45 or more couplers 50 and needles 64 are in fluid connection according to the requirements of the temperature differentiation and temperature range of the clinical thermnometer.

The arrays 60 and 62 of couplers 50 and tubular needles 64, operating in pairs, permits the concurrent filling of two clinical thermometers, following by a punching out of two thermometers prior to further packaging.

Method of Operation

Figure 4:
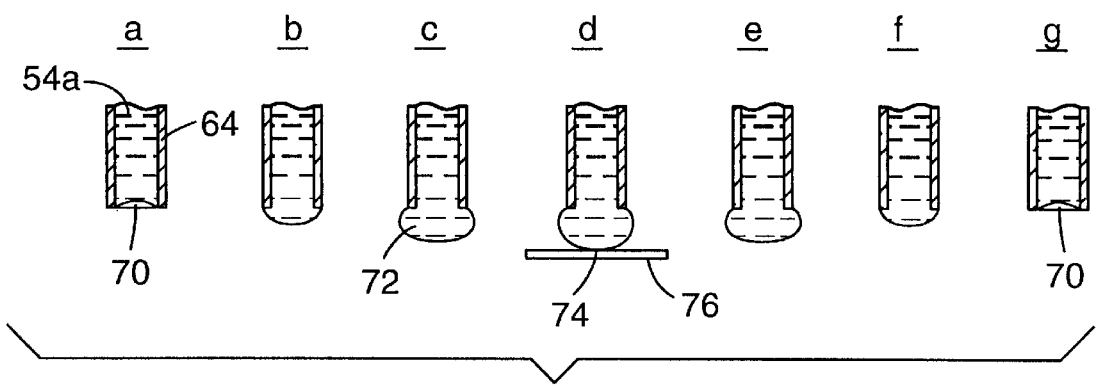
FIG. 4, comprising

FIG. 4 is a sequence of a single tubular needle 64 operating to deliver a precisely metered amount of emulsion composition 40 through the needle's open end 70. The operation of this metering/delivery sequence follows the teaching of Pickett et al., the specific disclosure of which is more specifically incorporated by reference herein. Generally, the progression from FIG. 4a to FIG. 4g has two concurrent motions:

(1) the motion of the needle 64 from apogee (FIG. 4a) to perigee (FIG. 4d) and back to apogee (FIG. 4g—matching FIG. 4a for the next metering and delivery) responsive to the pace of the clinical thermometer cavities passing underneath and the pace of flow of the emulsion composition 40 through the needle 64 (which is not interrupted); and (2) the motion of the formation of a dollop 72 of composition 40 at end 70 of needle 64, the size of such dollop being largest at the moment shown in FIG. 4d when the needle 64 is in maximum perigee.

As with the liquid compositions of Hof et al., the method of this invention employs the natural tension between cohesiveness of like compositions with adhesiveness of different compositions. As emulsion composition 40 forms a dollop 72 protruding from end 70, and the end of dollop 72 contacts a cavity 74 of thermometer 76, the adhesiveness of dollop 72 overtakes the cohesiveness of the emulsion composition 40 comprising the dollop 72, resulting in separation of dollop 72 from the composition 40 remaining in needle 64 as needle begins returning to apogee as seen in FIG. 4e.

Because each composition 40 emerging from each coupler 50 can be slightly different from any other composition and because it is possible for each length of tubing to have a slightly different internal fluid/solid friction interface, each delivery of composition requires separate "fine tuning" at each valve 52 even though composition remains under a continuous pressure exerted by a corresponding piston head 46. The fine tuning of flow of each emulsion composition is desirable to assure the apogee/perigee cycle of each needle 64 is maximized without spillage, overfilling, or underfilling by each dollop 72 of each cavity 74. Indeed, as needle 64 begins moving toward apogee in FIG. 4e, and adhesiveness overtakes cohesiveness within composition 40, the viscosity of composition 40 cause the dollop to extend conically from cavity 74 toward open end 70, much like the conical shape of an individually-size popular chocolate piece, e.g. the shape of a Hershey™ Kiss™ chocolate candy. After complete separation of dollop 72 from composition 40, gravity causes a natural flow of dollop 72 to a consistent level in cavity 74. However, this flow occurs well after the dollop 72 has separated from needle 64 and is remarkable for the truly unexpected manner in which a considerable viscous material comes to rest in a cavity during processing speeds of the apogee/perigee cycle ranging from about 0.4 secs. to about 0.6 secs. This cycle rate permits thermometers to move transversely under the array 62 of needles 64 at a velocity of from about 7 m/min. to about 12 m/min.

The use of an emulsion composition in a reversible thermometer not only improves performance of the thermometer but also greatly reduces manufacturing complexities. As described in Hof et al., there are numerous freeze/thaw cycles after delivery of the temperature indicating compositions of matter in the conventional assembly process. With the method and apparatus of the present invention being able to employ emulsion compositions, none of the freeze/thaw cycles need be employed. The energy savings and quality assurance efficiencies dramatic and unexpected benefits of the present invention.

Usefulness of the Invention

The ability to precisely meter and deliver a viscous emulsion composition during a rapid, automated assembly joining a multitude of different compositions with their corresponding resting cavities without spillage, overfilling, underfilling provides unexpected usefulness well beyond the immediate task of solving the problem of filling of clinical thermometers with new emulsion compositions for reversible thermometer usage.

This invention, both method and apparatus, can be applied to any system where an array of viscous materials need to be delivered in registration to a surface.

For example, in the candy-making industry where individually sized portions may be desired within a package, this invention can be adjusted to accommodate viscosities, cavity sizes, and line speeds.

For example, if different sized cavities are required with differing amounts of the same composition or differing compositions, this invention can be configured using valves 52 to individually deliver different amounts to different sized cavities.

Nor is the number of fluid pathways from cartridge 12 to needle 64 limited in either way from the 45 pathways used in the presently preferred array because of the temperature range and temperature differentiation selected for the reversible thermometer.

The placement and removal of cartridges is easy and environmentally safe. Moreover the composition 40 remains protected within the cartridge 12 from mixing through to delivery. This advantage also serves the food industry and the medical industry where quality control during manufacture is closely regulated.

While various materials for the apparatus of the present invention have been identified, it is to be understood that others skilled in the art can choose equally acceptable materials in substitution for any particular part(s). For example, depending on the emulsion composition employed, one can choose other metals or polymers which contact the composition, so long as the other materials are at least as equally inert to the emulsion and environmentally and medically benign.

While various embodiments have been described, the invention is not so limited. The claims follow.

What is claimed is:

1. An apparatus for metering and delivering a precise quantity of an emulsion composition to a surface, comprising:

(a) a cartridge having a volume containing the emulsion composition;

(b) a piston associated with the cartridge for collapsing the volume under a controlled pressure;

(c) a plurality of movable tubular needles for receiving a flow of the emulsion composition from the cartridge;

(d) a plurality of fluid connections, one fluid connection between one movable tubular needle and the cartridge for delivering the emulsion composition from the cartridge to the plurality of needles; and (e) a plurality of valves, one valve for one of the plurality of fluid connections, wherein the plurality of valves adjust pace and flow of the emulsion composition to meter and deliver a precise quantity of the emulsion composition to the surface through the plurality of movable tubular needles during movement of the plurality of movable tubular needles.

2. The apparatus according to claim 1, further comprising a plurality of sets, each set having a combination of one cartridge, one piston, a plurality of valves, a plurality of fluid connections, and a plurality of needles arranged with other of said sets to form an array for measuring and delivering a multitude of different compositions or a multitude of differing amounts of same or different compositions.

3. The apparatus according to claim 2, wherein the plurality of needles in the plurality of sets are movable through a cycle of apogee and perigee, wherein the needles are raised and lowered, respectively.

* * * * *